(12) United States Patent
Fukushima et al.

(10) Patent No.: US 7,754,365 B2
(45) Date of Patent: Jul. 13, 2010

(54) MEMBRANE ELECTRODE ASSEMBLY, METHOD FOR MANUFACTURING THE SAME, AND FUEL CELL INCLUDING THE SAME

(75) Inventors: Makoto Fukushima, Saitama (JP); Takashi Yasuo, Hyogo (JP); Shinichiro Imura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 208 days.

(21) Appl. No.: 12/073,480

(22) Filed: Mar. 6, 2008

(65) Prior Publication Data
US 2008/0220307 A1 Sep. 11, 2008

(30) Foreign Application Priority Data
Mar. 9, 2007 (JP) ............................ 2007-060911
Feb. 5, 2008 (JP) ............................ 2008-025700

(51) Int. Cl.
*H01M 8/10* (2006.01)
(52) U.S. Cl. .............................. 429/30; 429/33; 429/34; 429/38; 429/39
(58) Field of Classification Search .................. 429/30, 429/33, 34, 38, 39

See application file for complete search history.

(56) References Cited

U.S. PATENT DOCUMENTS
2004/0219412 A1 * 11/2004 Kimura et al. ................ 429/32

FOREIGN PATENT DOCUMENTS

| JP | 08-130023 | 5/1996 |
| JP | 2004-063167 | 2/2004 |
| JP | 2005-243427 | 9/2005 |
| JP | 2006-024556 | 1/2006 |
| JP | 2006-244715 | 9/2006 |
| JP | 2007-048605 | 2/2007 |

* cited by examiner

*Primary Examiner*—Patrick Ryan
*Assistant Examiner*—Ben Lewis
(74) *Attorney, Agent, or Firm*—McDermott Will & Emery LLP

(57) ABSTRACT

A membrane electrode assembly includes an electrolyte membrane, an anode disposed on one face of the electrolyte membrane, and a cathode disposed on the other face of the electrolyte membrane. The electrolyte membrane has a non-electrode-forming region where the cathode is not disposed on the surface of the non-electrode-forming region and an electrode-forming region where the cathode is disposed on the surface of the electrode-forming region. The non-electrode-forming region has a thin membrane region where the membrane is thinner than that in the electrode-forming region. The drop in power generation efficiency by water generated at the cathodes is prevented.

17 Claims, 11 Drawing Sheets

MEMBRANE ELECTRODE ASSEMBLY, METHOD FOR MANUFACTURING THE SAME, AND FUEL CELL INCLUDING THE SAME

CROSS-REFERENCE TO RELATED APPLICATIONS

This application is based upon and claims the benefit of priority from the prior Japanese Patent Application No. 2007-060911, filed on Mar. 9, 2007, and Japanese Patent Application No. 2008-025700, filed on Feb. 5, 2008, the entire contents of which are incorporated herein by reference.

BACKGROUND OF THE INVENTION

1. Field of the Invention

The present invention relates to a fuel cell for generating electrical energy by the use of a fuel containing hydrogen.

2. Description of the Related Art

Recently much attention has been focused on fuel cells that feature not only high energy conversion efficiency but also no hazardous substance produced by the electricity-generating reaction. Known as one of such fuel cells is the polymer electrolyte fuel cell which operates at temperatures below 100° C.

A polymer electrolyte fuel cell, which has a basic structure of a solid polymer electrolyte membrane disposed between a fuel electrode (anode) and an air electrode (cathode), generates power through an electrochemical reaction as described below by supplying a fuel gas containing hydrogen to the fuel electrode and an oxidant gas containing oxygen to the air electrode.

$$\text{Fuel electrode: } H_2 \rightarrow 2H^+ + 2e^- \quad (1)$$

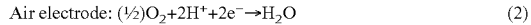

$$\text{Air electrode: } (½)O_2 + 2H^+ + 2e^- \rightarrow H_2O \quad (2)$$

The anode and the cathode have each a stacked structure of a catalyst layer and a gas diffusion layer. And a fuel cell is composed of catalyst layers of the respective electrodes disposed counter to each other in such a manner as to hold a solid polymer membrane therebetween. The catalyst layer is a layer of a catalyst or carbon particles carrying a catalyst bound together by an ion-exchange resin. The gas diffusion layer serves as a passage for the oxidant gas or the fuel gas.

At the anode, the hydrogen contained in the supplied fuel is decomposed into hydrogen ions and electrons as expressed in the above formula (1). Of them, the hydrogen ions travel inside the solid polymer electrolyte membrane toward the air electrode, whereas the electrons travel through an external circuit to the air electrode. At the cathode, on the other hand, the oxygen contained in the oxidant gas supplied thereto reacts with the hydrogen ions and electrons having come from the fuel electrode to produce water as expressed in the above formula (2).

As described above, water is produced at the cathode, and thus if the water stays on the cathode, the diffusion of air to the catalyst layer can be hindered, which can lead to lowered power generation efficiency.

SUMMARY OF THE INVENTION

The present invention has been made in view of the foregoing circumstances, and a general purpose thereof is to provide a technology capable of preventing drop in power generation efficiency due to water produced at the cathode.

In order to solve the above problems, a membrane electrode assembly according to one embodiment of the present invention includes: an electrolyte membrane; an anode disposed on one face of the electrolyte membrane; and a cathode disposed on the other face of the electrolyte membrane. The electrolyte membrane has a non-electrode-forming region where the cathode is not disposed thereon and an electrode-forming region where the cathode is disposed thereon. The non-electrode-forming region has a thin membrane region where the membrane is thinner than that in the electrode-forming region.

According to this embodiment, when applied to a fuel cell, the presence of a non-electrode-forming region where the cathode is not placed prevents water from staying at the cathode in the electrode-forming region because the water produced in the reaction during power generation at the cathode travels to the non-electrode-forming region. Thus, air is supplied to the cathode without impediment, thereby suppressing the drop in power generation efficiency. Also, the thin membrane region where the electrolyte membrane is formed thinner than that in the electrode-forming region allows more permeation of water, which makes it easier for the water produced at the cathode to travel to an anode side. As a result, the drying-up of an anode-side surface of the electrolyte membrane can be prevented without humidifying the fuel, such as hydrogen, to be supplied to the anode.

In a membrane electrode assembly according to the above-described embodiment, a plurality of cells, each comprising the electrolyte membrane, the anode and the cathode, may be formed in a planar arrangement, and thin membrane regions may be formed between cathodes of adjacent cells. In this arrangement, when applied to a fuel cell, the water produced in the reaction during power generation at the cathodes travels to the thin membrane regions which are non-electrode-forming regions between the cathodes, which prevents the water from staying at the cathodes. As a result, air is supplied to the cathodes without impediment, thus suppressing the drop in the power generation efficiency of the whole cell system. Also, the thin membrane regions where the electrolyte membrane is formed thinner than that in the electrode-forming region allow more permeation of water, which makes it easier for the water produced at the cathodes to travel to the anode side. As a result, the drying-up of an anode-side surface of the electrolyte membrane can be prevented without humidifying the fuel, such as hydrogen, to be supplied to the anode.

In a membrane electrode assembly according to the above-described embodiment, the thin membrane region may have a recess in a cathode-side surface of the electrolyte membrane. Such an arrangement can store water produced at the cathode in such a manner that the water may not easily come in contact with the cathode.

In a membrane electrode assembly according to the above-described embodiment, the thin membrane region may have a groove surrounded by the electrode-forming region. In a membrane electrode assembly according to the above-described embodiment, the groove may be formed linearly. Such an arrangement allows an easy formation of the thin membrane region.

In a membrane electrode assembly according to this embodiment, the thin membrane region may have a bent groove surrounded by the electrode-forming region. Such an arrangement can improve the strength of the membrane electrode assembly.

In a membrane electrode assembly according to the-above described embodiment, the thickness of the anode or cathode may be greater than or equal to 5 μm and less than or equal to 100 μm. Also, the groove may be formed discontinuously.

Such an arrangement can improve the strength of the membrane electrode assembly. Here, the groove may be 5 μm or more and 200 μm or less in width. If the width of the groove is 5 μm or more, the groove will not be collapsed in the event that the electrolyte membrane is deformed due to the swelling and therefore the water produced at the cathode in the electrode-forming region can be sufficiently transported to the thin membrane region. And if the width of the groove is 200 μm or less, the flooding can be prevented in the event that the amount of generated water increases by about 10% more than the rating due to variation in output and at the same time the drop in area of an electrode-forming region can be controlled within less than 10%.

In a membrane electrode assembly according to the above-described embodiment, the thin membrane region may have a thickness of 50% or more of the membrane thickness in the electrode-forming region and at the same time a thickness 5 μm or more thinner than the membrane thickness in the electrode-forming region. Such an arrangement makes it easier for the water produced at the cathodes to travel to the anode side while maintaining the strength of the electrolyte membrane as a whole.

The ratio of an area of thin membrane regions to that of electrode-forming regions may be in a range of greater than or equal to 0.01 and less than or equal to 0.1. Such an arrangement can prevent the water produced at the cathodes from staying in the electrode-forming regions while securing the amount of power generation in the electrode-forming regions.

A membrane electrode assembly according to another embodiment of the present invention includes an electrolyte membrane; an anode disposed on one face of the electrolyte membrane; and a cathode disposed on the other face of the electrolyte membrane. The electrolyte membrane has a non-electrode-forming region where the cathode is not disposed thereon and an electrode-forming region where the cathode is disposed thereon. In the non-electrode-forming region, the electrolyte membrane has a thin membrane region where the thin membrane is recessed lower than the surface of the electrolyte membrane in an adjacent electrode-forming region.

Still another embodiment of the present invention relates to a fuel cell. The fuel cell includes a membrane electrode assembly according to any one of the above-described embodiments.

Still another embodiment of the present invention relates to a method for manufacturing a membrane electrode assembly. A membrane electrode assembly to which this method can be suitably applied includes: an electrolyte membrane; an anode disposed on one face of the electrolyte membrane; and a cathode disposed on the other face of the electrolyte membrane, wherein the electrolyte membrane has a non-electrode-forming region where the cathode is not disposed thereon and an electrode-forming region where the cathode is disposed thereon. And this method for manufacturing a membrane electrode assembly includes a thin membrane forming process in which a thin membrane region with a thickness thinner than the electrolyte membrane in the electrode-forming region and having an exposed surface is formed as part of the non-electrode-forming region.

According to this embodiment, a thin membrane region with the thickness thinner than the electrolyte membrane in the electrode-forming region and having an exposed surface can be formed as part of the non-electrode-forming region. Hence, it is possible to manufacture a membrane electrode assembly which, when incorporated into a fuel cell, is capable of preventing water from staying around the cathode in the electrode-forming region.

The thin membrane forming process may include a process for removing a surface layer of the electrolyte membrane together with the cathode or the anode, using laser whose oscillation wavelength is greater than or equal to 100 nm and less than or equal to 1100 nm. If the oscillation wavelength of the laser is 1100 nm or less, the thermal effect on an electrode-forming region other than the range where the laser has been irradiated can be suppressed. If the oscillation wavelength of the laser is 100 nm or more, the cathode or anode can be easily removed. Thus, if the oscillation wavelength of the laser lies within the above-described range, the anode or cathode can be removed and at the same time the thin membrane region can be formed without penetrating the electrolyte membrane.

Further, the thin membrane forming process may include a process for removing a surface layer of the electrolyte membrane together with the cathode or the anode, using laser whose oscillation wavelength is greater than or equal to 180 nm and less than or equal to 550 nm. If the oscillation wavelength of the laser lies within the above-described range, the laser beams can be focused on a finer range, so that the thin membrane region can be formed with accuracy. For example, the type of laser may be KrF excimer laser.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
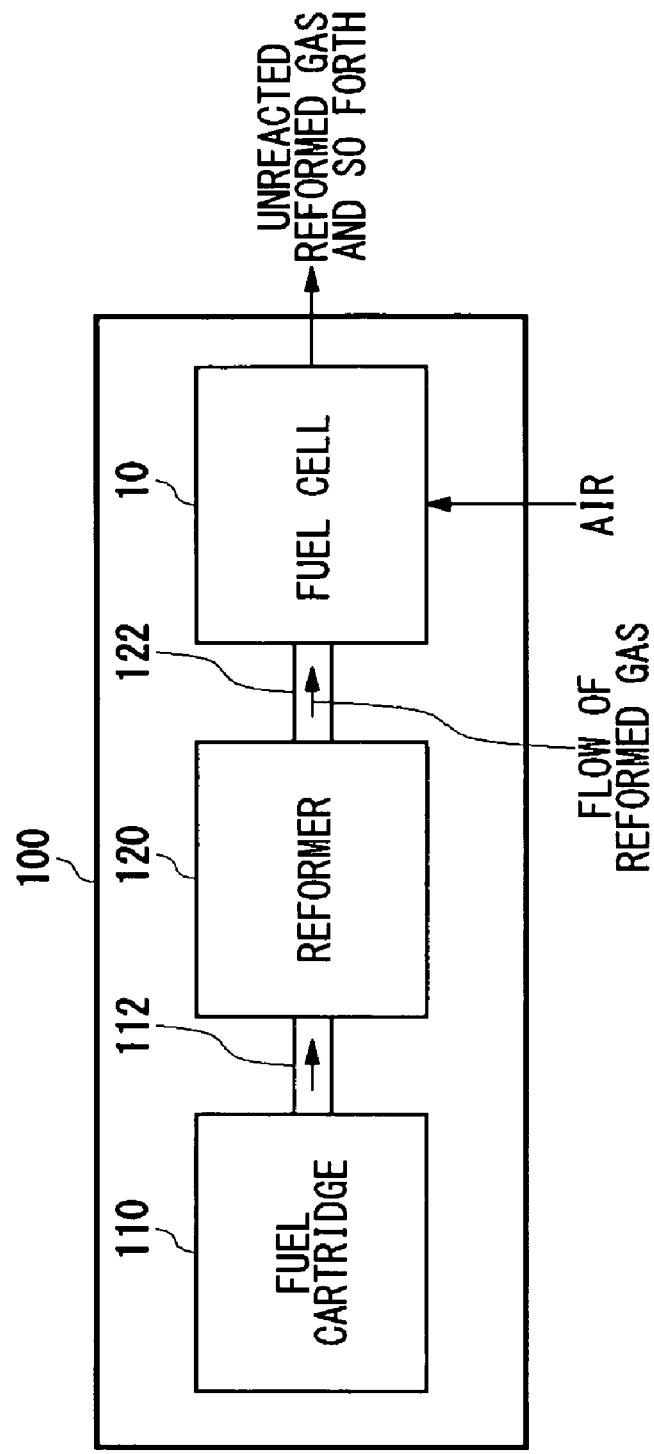
FIG. 1 is a schematic diagram showing a structure of a fuel cell system according to a first embodiment of the present invention.

The invention will now be described by reference to the preferred embodiments. This does not intend to limit the scope of the present invention, but to exemplify the invention.

The embodiments will now be described with reference to drawings. Note that in all of the Figures the same reference numerals are given to the same components and the repeated description thereof is omitted as appropriate. The structures described hereinbelow are only exemplary and does not limit the scope of the present invention.

First Embodiment

FIG. 1 is a schematic diagram showing a structure of a fuel cell system 100 according to a first embodiment of the present invention. The fuel cell system 100 according to the first embodiment can be suitably used as a power source for mobile devices such as notebook-sized PCs or mobile phones. As illustrated in FIG. 1, the fuel cell system 100 includes a fuel cartridge 110, a reformer 120, and a fuel cell 10.

The fuel cartridge 110 stores a hydrocarbon fuel, such as methanol, methane or butane. The fuel cartridge 110 is detachable, so that when the hydrocarbon fuel has been mostly consumed, the one with little remaining content may be replaced with a new one charged sufficiently with the hydrocarbon fuel. The hydrocarbon fuel discharged from the fuel cartridge 110 is sent to the reformer 120 via piping 112. Note that there may be a carburetor, a desulfurizer, or such other arrangement installed between the fuel cartridge 110 and the reformer 120 as required.

The reformer 120 changes the hydrocarbon fuel sent from the fuel cartridge 110 into a reformed gas containing hydrogen by a known steam reforming process. The reformer 120 may be further provided with a shift reactor capable of converting carbon monoxide and steam in the reformed gas into hydrogen and carbon dioxide or a CO remover capable of reducing carbon monoxide concentration in the reformed gas. The reformed gas produced by the reformer 120 is supplied to the fuel cell 10 via the piping 122 to be used as a fuel gas necessary for power generation by the fuel cell 10.

Figure 2:
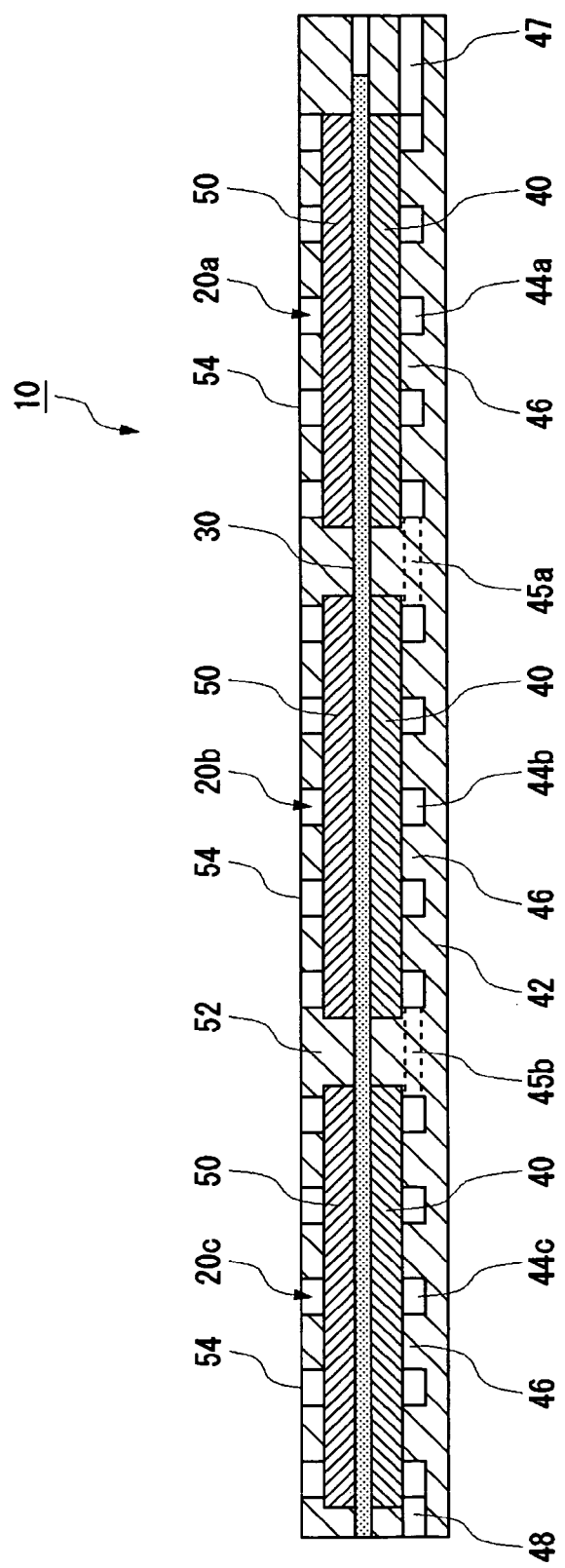
FIG. 2 is a schematic cross-sectional view showing a specific structure of a fuel cell.

FIG. 2 is a schematic cross-sectional view showing a specific structure of the fuel cell 10. The fuel cell 10 has a planar module structure in which a plurality of cells, comprised of a cell 20a, a cell 20b and a cell 20c, are disposed in a planar arrangement.

The cells 20a, 20b and 20c include each a membrane electrode assembly comprised of an electrolyte membrane 30 of Nafion (registered trademark) or the like interposed between an anode 40 and a cathode 50. Such a composite membrane structure may be fabricated by a method as disclosed in Japanese Patent Application Laid-Open No. 2006-244715, for instance.

The catalyst that constitutes the anode 40 and the cathode 50 is, for instance, a metal, such as platinum, palladium, ruthenium, cobalt, iridium, or an alloy combining these metals, or carbon that supports these metals or the alloy. Also, a porous electrode base material may be provided on a surface, of the anode 40 and the cathode 50, not in contact with the electrolyte membrane 30. The electrode base material is, for instance, carbon cloth, carbon paper, or the like.

Adjacent cells are connected with each other in series by such connecting means as current collector, wiring (both not shown) or the like, and thus they can supply electric power to the exterior.

Provided on the anode side of the cells 20a, 20b and 20c are fuel chambers 44a, 44b and 44c, respectively, partitioned by a fuel chamber housing 42. Formed on the fuel chamber housing 42 are ribs 46 which are used to hold down the anodes 40 via current collectors (not shown). This arrangement strengthens adhesion between anodes 40 and current collectors, which, in turn, improves current collection performance at the anodes 40.

Provided in the lateral part of the fuel chamber housing 42 near the cell 20a is a fuel inlet 47 through which the reformed gas is supplied. The fuel chamber 44a and the fuel chamber 44b are communicated by a channel 45a. Also, the fuel chamber 44b and the fuel chamber 44c are communicated by a channel 45b. Provided in the lateral part of the fuel chamber housing 42 near the cell 20c is a fuel outlet 48 through which unreacted reformed gas and the like are discharged. With a fuel flow passage like this, the reformed gas introduced through the fuel inlet 47 passes through the fuel chamber 44a, the fuel chamber 44b, and the fuel chamber 44c, in this order, and after use for power generation, exits through the fuel outlet 48.

On the other hand, provided on the cathode side of the cells 20a, 20b and 20c is an air chamber housing 52. In the air chamber housing 52, air inlets 54 are provided as oxidant passages. Through the air inlets 54, air is supplied to the cathodes 50 from outside. Note that, though not shown in FIG. 2, the cathodes 50 are formed with grooves to be described later. Also, the electrolyte membrane 30 has thin membrane regions.

Figure 3A:
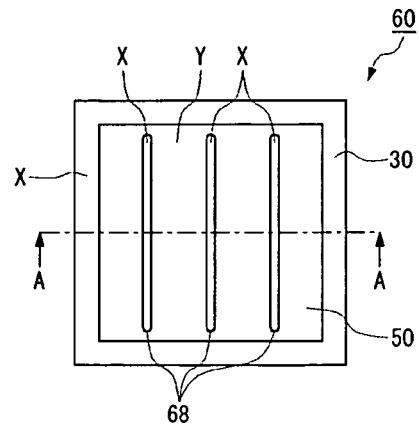
FIG. 3A is a top view of a membrane electrode assembly according to a first embodiment.
Figure 3B:
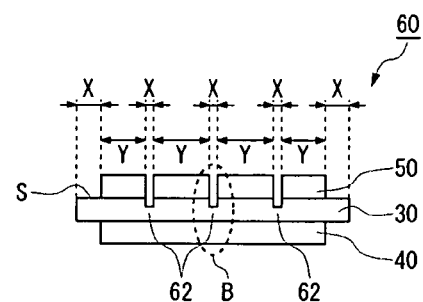
FIG. 3B is a cross-sectional view taken along line A-A of a membrane electrode assembly of FIG. 3A.
Figure 3C:
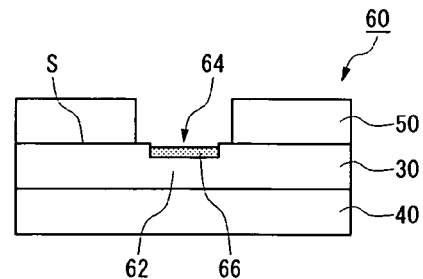
FIG. 3C is an enlarged sectional view of region B of a membrane electrode assembly shown in FIG. 3B.
Figure 3D:
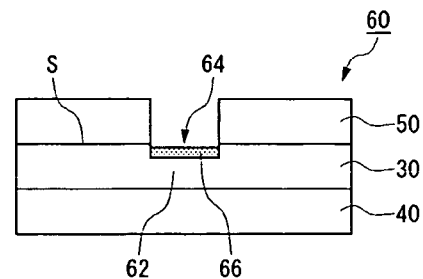
FIG. 3D is an enlarged sectional view of region B in a modification of the membrane electrode assembly according to the first embodiment.

Now a description will be given of a structure of a membrane electrode assembly, which is an integral part of each of the cells 20a, 20b and 20c. FIG. 3A is a top view of a membrane electrode assembly according to the first embodiment. FIG. 3B is a cross-sectional view taken along line A-A of the membrane electrode assembly of FIG. 3A. FIG. 3C is an enlarged sectional view of region B of a membrane electrode assembly shown in FIG. 3B. FIG. 3D is an enlarged sectional view of region B in a modification of the membrane electrode assembly according to the first embodiment.

A membrane electrode assembly 60 according to the first embodiment includes an electrolyte membrane 30, an anode 40 disposed on one face of the electrolyte membrane 30, and a cathode 50 disposed on the other face of the electrolyte membrane 30. The electrolyte membrane 30 has a non-electrode-forming region X where the cathode 50 is not disposed on surface S and an electrode-forming region Y where the cathode 50 is disposed on surface S. The membrane thickness of the electrolyte membrane 30 in the electrode-forming region Y according to this first embodiment is preferably 25 µm or more and 200 µm or less. In the non-electrode-forming region X, the electrolyte membrane 30 has a thin membrane region 62 where the membrane is thinner than that in the electrode-forming region Y.

Accordingly, when the membrane electrode assembly 60 is applied to the fuel cell 10 as described above, the presence of the non-electrode-forming region X where the cathode 50 is not placed prevents water from staying at the cathode 50 in the electrode-forming region Y because the water produced in the reaction during power generation at the cathode 50 travels to the non-electrode-forming region X. Thus air can be supplied to the cathode 50 without impediment, thus preventing the drop in power generation efficiency and resulting in retention of high performance over a long period of time.

Also, the thin membrane region 62 where the electrolyte membrane 30 is formed thinner than that in the electrode-forming region Y allows more permeation of water, which makes it easier for the water produced at the cathode 50 to travel to the anode 40 side. As a result, the drying-up of the anode-side surface of the electrolyte membrane 30 can be prevented without humidifying the fuel, such as hydrogen, to be supplied to the anode 40. Thus, a mechanism for humidifying the fuel in the fuel cell system 100 can be omitted or simplified with the result that the system can be made smaller and the cost reduced.

It is to be noted that the non-electrode-forming region X according to the present embodiment is formed with a thin membrane region 62 where the electrolyte membrane 30 is recessed lower than surface S of the electrolyte membrane 30 in the adjacent electrode-forming region Y. Specifically, the thin membrane region 62, as illustrated in FIG. 3C, is provided with a recess 64, which is a depression of surface S of the electrolyte membrane 30 on the cathode 50 side. This arrangement makes it possible to store generated water 66 produced at the cathode 50 in such a manner that the water 66 may not easily come in contact with the cathode 50. Note also that the thin membrane region 62 provided with the recess 64 may have the membrane thickness formed thinner as it gets farther from the electrode-forming region Y.

Also, as illustrated in FIG. 3A, the thin membrane region 62 has a linear groove 68 surrounded by an electrode-forming region Y. Such a groove 68 can collect water produced at the cathode 50 from a wider area in the electrode-forming region Y and have the water permeate to the anode 40 side efficiently.

It is preferable that the thin membrane region 62 may have the thickness of 50% or more of the membrane thickness in the electrode-forming region Y. Such an arrangement can maintain the strength of the electrolyte membrane 30 as a whole. It is also preferable that the thin membrane region 62 may have the thickness 5 μm or more thinner than the membrane thickness in the electrode-forming region Y. Such an arrangement makes it easier for the water produced at the cathode 50 to travel to the anode 40.

It is preferable that the ratio of the area of thin membrane regions 62 to the area of electrode-forming regions Y may be greater than or equal to 0.01. Such an arrangement prevents the water produced at the cathodes 50 from staying in the electrode-forming regions Y. More preferably, the ratio of the area of thin membrane regions 62 to the area of electrode-forming regions Y may be greater than or equal to 0.05. Such an arrangement more effectively prevents the water produced at the cathodes 50 from staying in the electrode-forming regions Y. Further, the ratio of the area of thin membrane regions 62 to the area of electrode-forming regions Y may preferably be less than or equal to 0.1. Such an arrangement helps secure the sufficient amount of power generation in the electrode-forming regions Y.

In the membrane electrode assembly shown in FIG. 3C, the thin membrane region 62 is formed to have the width narrower than that of the non-electrode-forming region X. However, as in the membrane electrode assembly shown in FIG. 3D, the thin membrane region 62 may be formed over the entire width region of the non-electrode-forming region X.

Laser whose oscillation wavelength is greater than or equal to 100 nm and less than or equal to 1100 nm is preferably used in the microfabrication of the recess 64, the groove 68 or the like in the thin membrane region 62. As a result, the thin membrane region can be easily formed while the thermal effect on the surrounding electrode-forming region is suppressed. The laser whose wavelength is in the above-described range is, for instance, YAG laser, $YVO_4$ laser (the wavelength: 1064 nm), $YAG/YVO_4$ second harmonic (532 nm), $YAG/YVO_4$ third harmonic (355 nm), $YAG/YVO_4$ fourth harmonic (266 nm), XeF excimer laser (351 nm), XeCl (308 nm), KrF excimer laser (248 nm), KrCl excimer laser (222 nm), ArF excimer laser (193 nm), $Xe_2$ excimer laser (172 nm), $Kr_2$ excimer laser (146 nm), $Ar_2$ excimer laser (126 nm), or the like. More preferably, laser whose wavelength is greater than or equal to 180 nm and less than or equal to 550 nm is used. Thereby, the thin membrane region can be formed with accuracy.

The method for manufacturing a membrane electrode assembly according to the first embodiment includes a thin membrane forming process in which the thin membrane region 62 with a thickness thinner than the electrolyte membrane 30 in the electrode-forming region Y and having an exposed surface is formed as part of the non-electrode-forming region X.

According to this first embodiment, the thin membrane region 62 with the thickness thinner than the electrolyte membrane 30 in the electrode-forming region Y and having an exposed surface can be formed as part of the non-electrode-forming region X. Hence, it is possible to manufacture a membrane electrode assembly 60 which, when incorporated into the fuel cell 10, is capable of preventing water from staying around the cathode 50 in the electrode-forming region Y.

In this manufacturing method, laser is irradiated to predetermined regions from above the cathode 50 or the anode 40, so that portions of the cathode 50 or the anode 40 are removed in fine width until the electrolyte membrane 30 is reached in depth. Furthermore, the removal of the surface layer of the electrolyte membrane 30 in fine widths in the same way as with the cathode 50 or the anode 40 allows easy and accurate formation of the thin membrane region 62.

Figure 9:
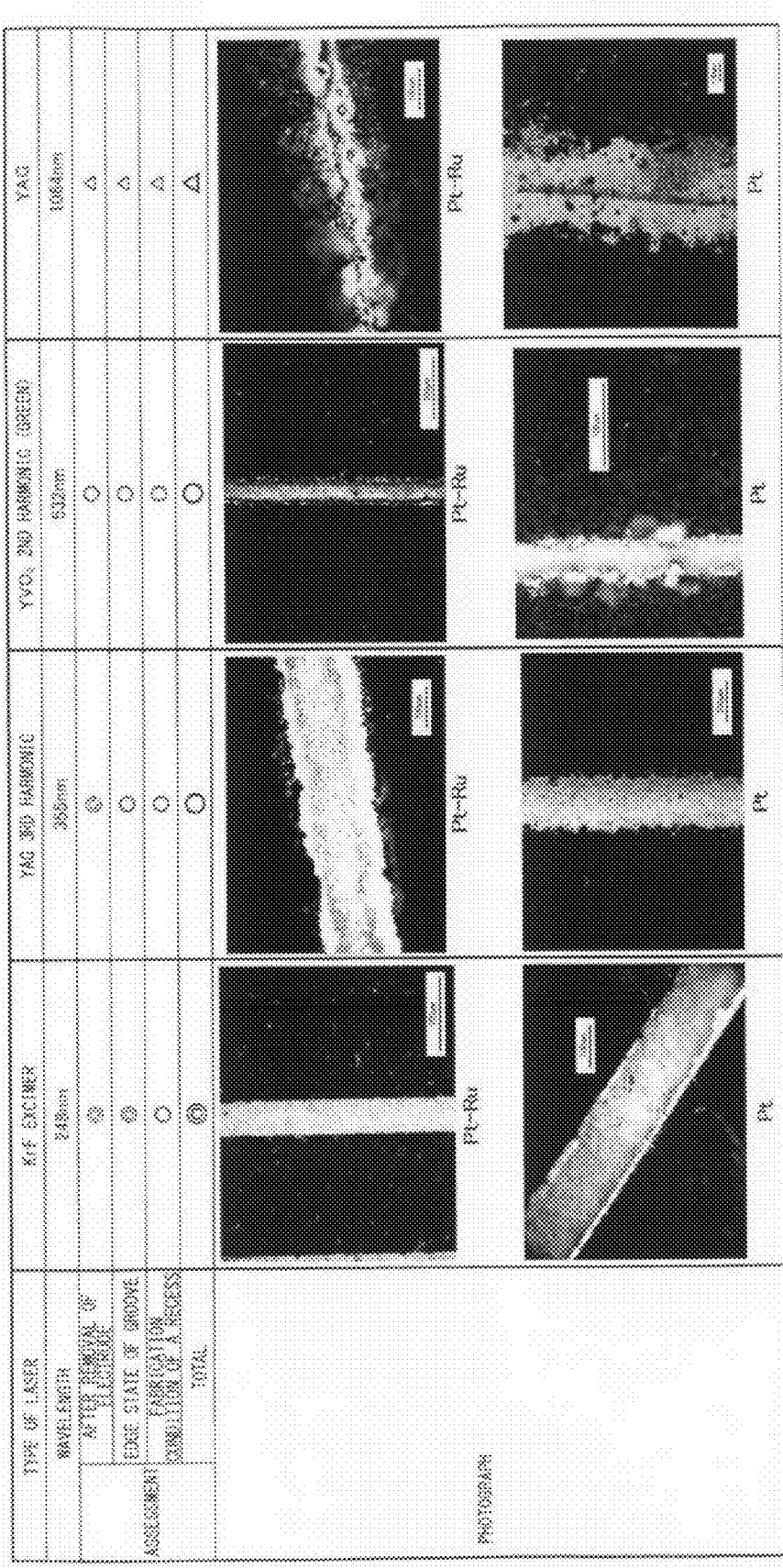
FIG. 9 is a table showing top-surface micrographs of a recess formed by various types of lasers and a condition assessment thereof.

FIG. 9 is a table showing top-surface micrographs of a recess formed by various types of lasers and a condition assessment thereof. FIGS. 10A to 10D are pattern diagrams based on the micrographs shown in FIG. 9. In evaluation items shown in FIG. 9, the state where an electrode has been removed ("after removal of electrode") is determined by whether or not an electrode has been removed and the electrolyte membrane is sufficiently exposed. The "edge state of groove" is determined by whether the asperity of a portion of the electrode exposed on a recess is sufficiently small or not. The "fabrication condition of a recess" is determined by whether the shape of a recess along a longitudinal direction agrees with a designed shape or not. Here, the evaluation in the table is indicated by the degree of excellence in the descending order of double circle, circle and triangle symbols. The photographs on the top in FIG. 9 indicate a case when the electrode is Pt—Ru, whereas those on the bottom indicate a case when the electrode is Pt. FIGS. 10A to 10D are pattern diagrams corresponding to the respective photographs shown on the bottom. A description is now given centering around the pattern diagrams shown in FIG. 10A to 10D.

Figure 10D:
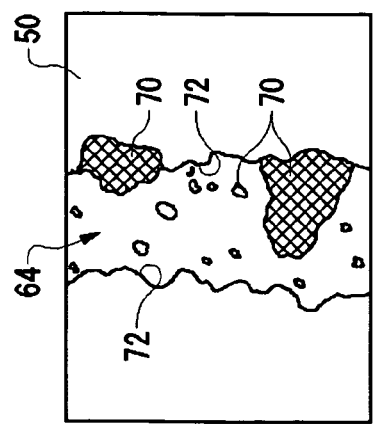
FIGS. 10A to 10D are pattern diagrams based on the micrographs shown in FIG. 9.
Figure 10C:
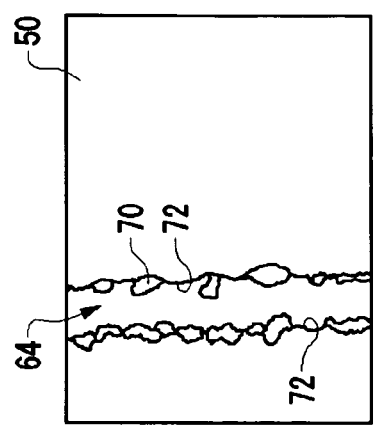

FIG. 10D is a pattern diagram showing a case when part of a Pt electrode is removed using YAG laser. As evident from FIG. 10D, many residues 70 of the electrode are present in a bottom of a recess 64, and the asperity of the edge 72 of a groove is largest among the lasers used in this experiment. Moreover, the shapes of the recess is nonuniform and it may be concluded that the fabrication condition of a recess is not satisfactory. In contrast, as shown in FIG. 10C, when part of an electrode is removed using $YVO_4$ second harmonic laser, almost none of residue of the electrode is found at least at the center of the bottom of the recess 64. Also, the asperity of the edge 72 of a groove and the fabrication condition of the recess 64 are more favorable than those in the case of YAG laser.

Figure 10B:
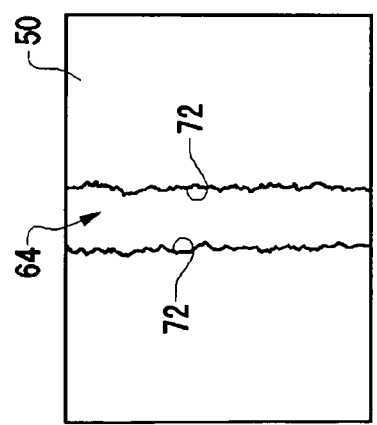
Figure 10A:
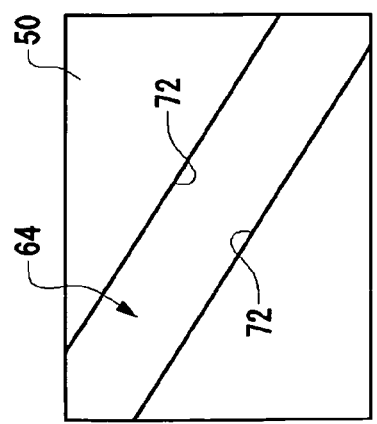

As shown in FIG. 10B, when part of an electrode is removed using YAG third harmonic laser, almost no residue of the electrode is found in the recess 64 as compared with the case of YVO$_4$ second harmonic laser used. Further, as shown in FIG. 10A, when part of an electrode is removed using KrF excimer, the asperity of the edge 72 of a groove is improved over that obtained using the YAG third harmonic. In this manner, the use of KrF excimer laser allows the removal of the electrode with accuracy and uniform formation of a recess in agreement with the designed shape.

When KrF excimer laser is used, the conditions for laser processing according to this embodiment are selected as appropriate from within the ranges of 1 J/cm$^2$ to 10 J/cm$^2$ for energy density and 3 to 50 shots as the number of shots, in consideration of the material and thickness of the cathode 50 and the anode 40.

Second Embodiment

Figure 4:
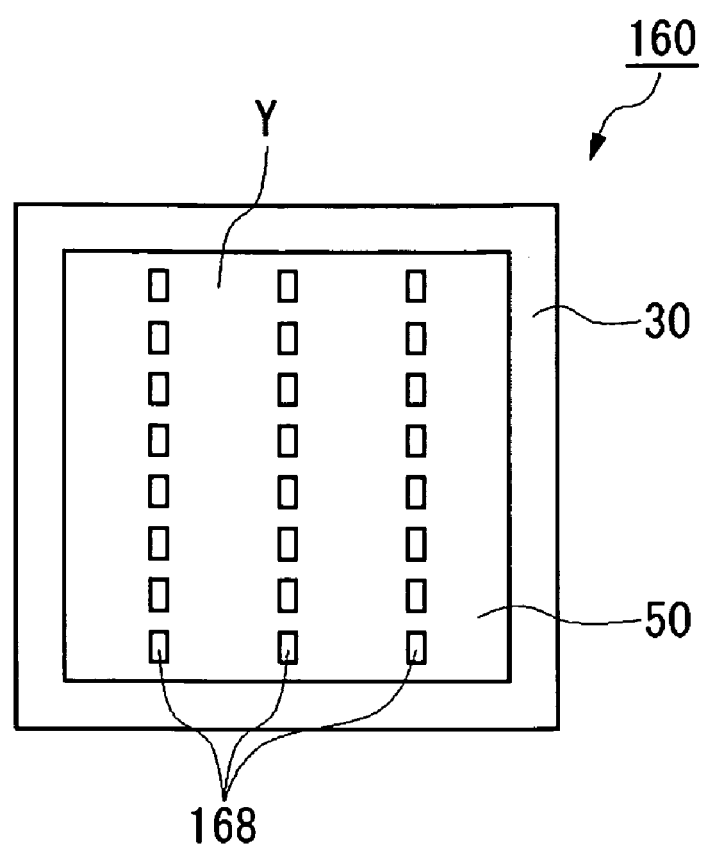
FIG. 4 is a top view of a membrane electrode assembly according to a second embodiment of the present invention.

FIG. 4 is a top view of a membrane electrode assembly according to a second embodiment of the present invention. The membrane electrode assembly 160 according to the second embodiment has discontinuously and linearly arranged grooves 168 surrounded by an electrode-forming region Y unlike the linear grooves 68 of the membrane electrode assembly 60 according to the first embodiment. This arrangement improves the strength of the membrane electrode assembly 160.

Third Embodiment

Figure 5:
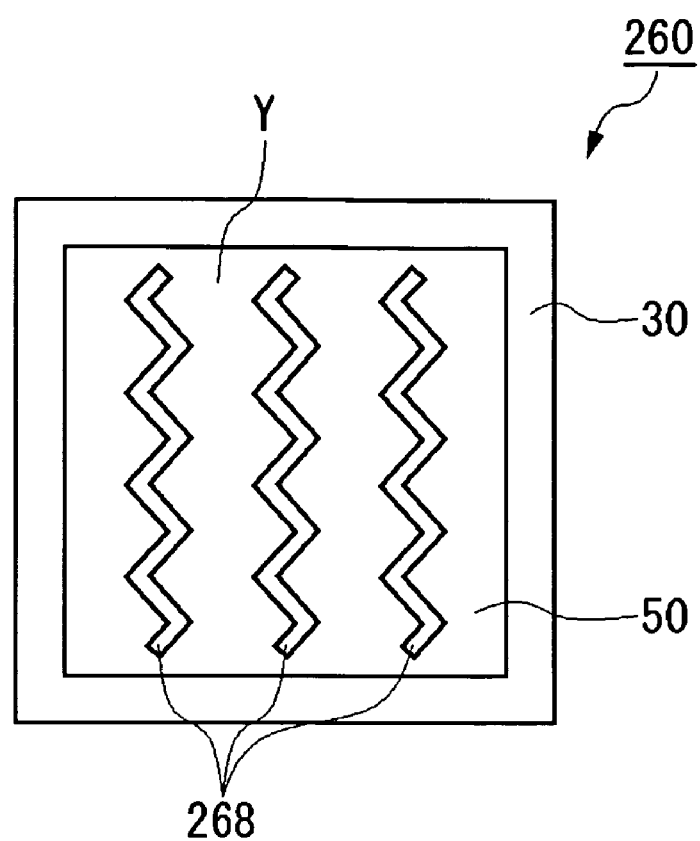
FIG. 5 is a top view of a membrane electrode assembly according to a third embodiment of the present invention.

FIG. 5 is a top view of a membrane electrode assembly according to a third embodiment of the present invention. The membrane electrode assembly 260 according to the third embodiment has continuous and zigzag-like bent grooves 268 surrounded by an electrode-forming region Y unlike the linear grooves 68 of the membrane electrode assembly 60 according to the first embodiment. This arrangement improves the strength of the membrane electrode assembly 260.

Fourth Embodiment

Figure 6:
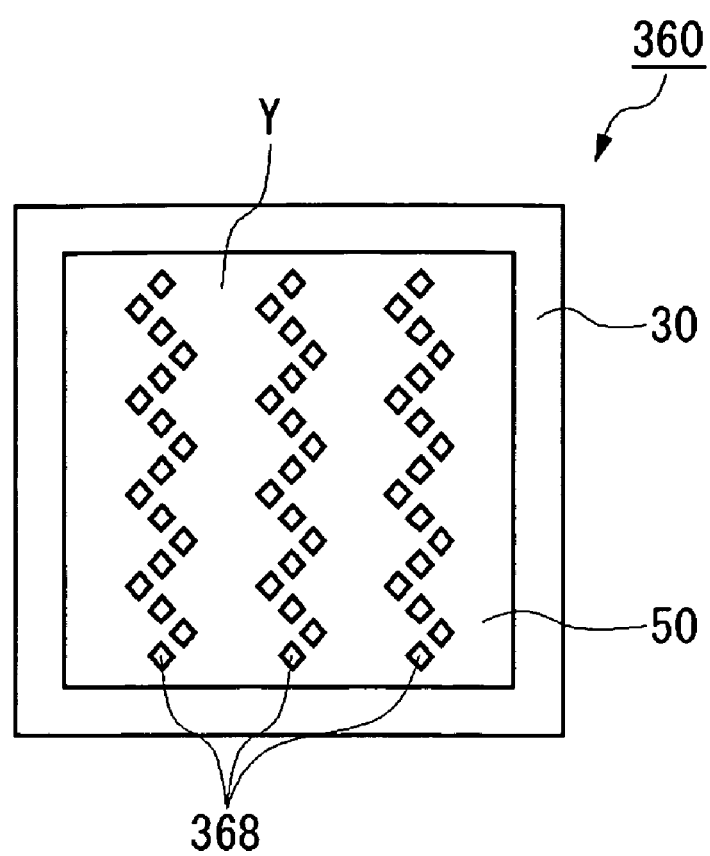
FIG. 6 is a top view of a membrane electrode assembly according to a fourth embodiment of the present invention.

FIG. 6 is a top view of a membrane electrode assembly according to a fourth embodiment of the present invention. The membrane electrode assembly 360 according to the fourth embodiment has discontinuous and zigzag-like grooves 368 surrounded by an electrode-forming region Y unlike the linear grooves 68 of the membrane electrode assembly 60 according to the first embodiment. This arrangement improves the strength of the membrane electrode assembly 360.

It is to be noted that the grooves as described in the foregoing embodiments is preferably greater than or equal to 5 µm and less than or equal to 200 µm in width. If the width of the groove is 5 µm or more, the water produced at the cathode 50 in the electrode-forming region Y can be sufficiently transported to the thin membrane region 62. If the width of the groove is 200 µm or less, the flooding can be prevented in the event that the amount of generated water increases by about 10% more than the rating due to variation in output and at the same time the drop in area of an electrode-forming region Y can be controlled within less than 10%.

Figure 11:
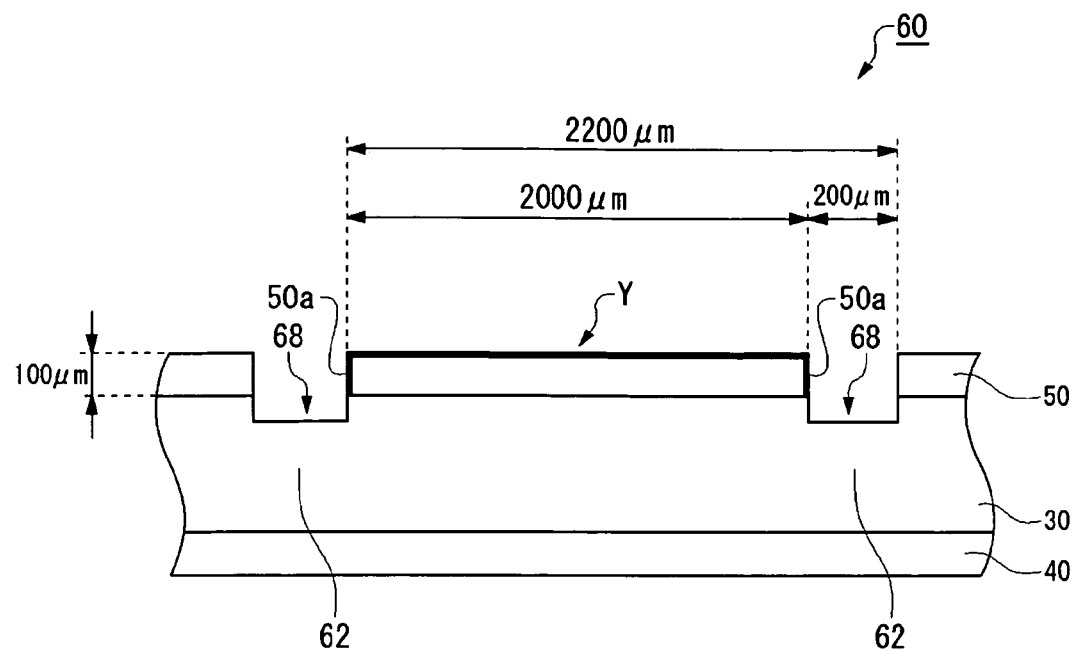
FIG. 11 is a diagram to explain how the width of a groove affects an output of a fuel cell.

FIG. 11 is a diagram to explain how the width of a groove affects an output of a fuel cell. If the output of the fuel cell varies (increases), the amount of generated water will also vary (increase). However, it is difficult to have a mechanism to actively discharge the generated water in the fuel cell applied to a portable device. Accordingly, the variation in the amount of the generated water significantly affects the flooding.

For example, when a predicted output variation (increase) is about 10%, the amount of variation in the amount of the generated water is also about 10% and therefore it is considered that a region (surface area of a cathode) that the water passes is increased by 10%. In the light of this, as shown in FIG. 11, it is preferable that the membrane thickness of the cathode 50 is 10 µm and grooves 68 of 200 µm in width are formed between the respective electrode-forming regions Y of 2 mm in width.

As a result, a side surface 50a of the groove 68 is exposed. Thus, as compared with a case where the groove is not formed, the surface area of each electrode-forming region Y is larger by a factor of (2000+10×2)/2000=1.1 and it increases by 10%. Thus, even when the output increases by 10%, the surface area of the cathode from which the generated water is discharged increases also, so that the flooding can be suppressed. Since the groove 68 is a non-electrode-forming region, the ratio of the area contributable to the power generation is 2000/(2000+200)=0.91 and it drops. However, as described above, the flooding can be sufficiently suppressed by increasing the surface area of the cathode 50, thus preventing drop in power generation efficiency.

Fifth Embodiment

Generally, when a plurality of cells as in the fuel cell 10 of FIG. 2 are to be manufactured, it is necessary to provide a plurality of anodes and cathodes at equal intervals on their respective sides of a single electrolyte membrane. To do so, the member parts processed individually for each of the anodes and the cathodes need to be arranged on the surface of the electrolyte membrane accurately and press-bonded thereto. Since such operation can increase manufacturing processes and compromise productivity, further improvements are desired.

Also, with the method as described above, it is difficult to narrow the distance between the cathodes or anodes of adjacent cells, and consequently the proportion of the area of non-electrode-forming regions, which do not contribute to power generation, tends to be large. Hence, size reduction together with further improvement of power generation efficiency is desired.

Figure 7A:
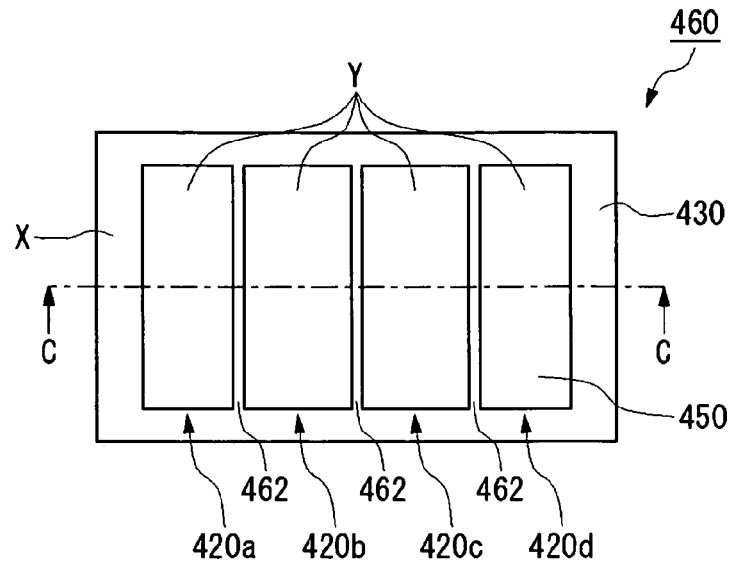
FIG. 7A is a top view of a membrane electrode assembly according to a fifth embodiment.
Figure 7B:
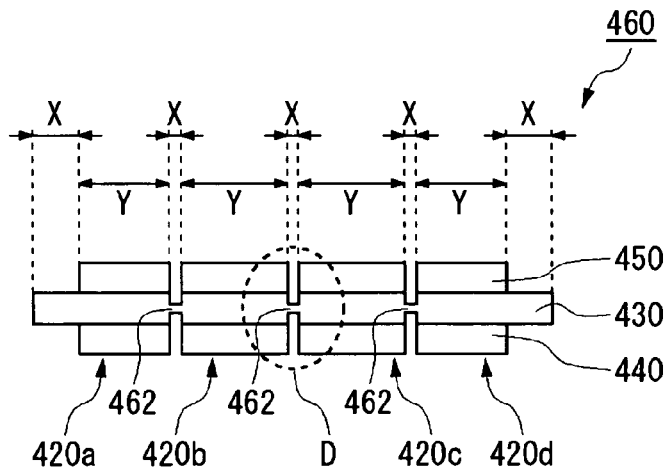
FIG. 7B is a cross-sectional view taken along line C-C of a membrane electrode assembly of FIG. 7A.
Figure 7C:
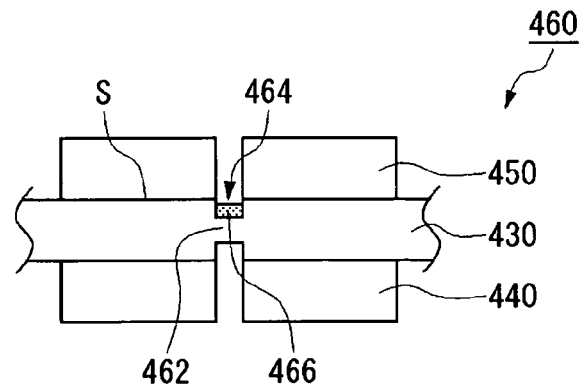
FIG. 7C is an enlarged sectional view of region D of a membrane electrode assembly shown in FIG. 7B.

With the fifth embodiment, therefore, a technology for forming a plurality of cells by the use of the aforementioned KrF excimer laser will be described by referring to FIGS. 7A to 7C. FIG. 7A is a top view of a membrane electrode assembly according to the fifth embodiment. FIG. 7B is a cross-sectional view taken along line C-C of the membrane electrode assembly of FIG. 7A. FIG. 7C is an enlarged sectional view of region D of the membrane electrode assembly shown in FIG. 7B.

A membrane electrode assembly 460 according to this fifth embodiment includes a plurality of cells 420 (420a, 420b, 420c, 420d) formed in a planar arrangement, each of which comprises an electrolyte membrane 430, an anode 440 disposed on one face of the electrolyte membrane 430, and a cathode 450 disposed on the other face of the electrolyte membrane 430. A thin membrane region 462 is formed between the cathodes of adjacent cells 420.

The electrolyte membrane 430 has a non-electrode-forming region X where the cathode 450 is not disposed on surface S and an electrode-forming region Y where the cathode 450 is disposed on surface S. In the non-electrode-forming region X, the electrolyte membrane 430 has a thin membrane region 462 where the membrane is thinner than that in the electrode-forming region Y.

Accordingly, when the membrane electrode assembly 460 is applied to the fuel cell 10 as described above, the presence of the non-electrode-forming region X where the cathode 450 is not placed prevents water from staying at the cathode 450 in the electrode-forming region Y because the water produced in the reaction during power generation at the cathode 450 travels to the thin membrane region 462 which is the non-electrode-forming region X between the cathodes. Thus, air can be supplied to the cathode 450 without impediment, thereby suppressing the drop in power generation efficiency of the fuel cell as a whole.

The thin membrane region 462 where the electrolyte membrane 430 is formed thinner than that in the electrode-forming region Y allows more permeation of water, which makes it easier for the water produced at the cathode 450 to travel to the anode 440 side. As a result, the drying-up of the anode-side surface of the electrolyte membrane 430 can be prevented without humidifying the fuel, such as hydrogen, to be supplied to the anode 440. Thus, a mechanism for humidifying the fuel in the fuel cell system 100 can be omitted or simplified with the result that the system can be made smaller and the cost reduced.

The thin membrane region 462, as illustrated in FIG. 7C, is provided with a recess 464, which is a depression of surface S of the electrolyte membrane 430 on the cathode 450 side. This arrangement makes it possible to store generated water 466 produced at the cathode 450 in such a manner that the water 466 may not easily come in contact with the cathode 450.

When manufacturing a membrane electrode assembly 460 according to the fifth embodiment, KrF excimer laser as described in the first embodiment is used. In this fifth embodiment, a single undivided member unit comprised of a single electrolyte membrane and anodes and cathodes on their respective faces thereof is first prepared, and then the anodes and cathodes corresponding to their respective cells are divided from each other by KrF excimer laser irradiation. This processing can make the distance between the cells far narrower than the conventional case and the non-electrode-forming region X smaller, so that a wider area can be obtained for the electrode-forming region Y. Thus, by the use of excimer laser according to this embodiment, the distance between the cells can be reduced to about 30 µm to 300 µm.

Therefore, the method as described above can realize the manufacture of a membrane electrode assembly with a plurality of cells as in the fuel cell 10 of FIG. 2 such that a plurality of anodes and cathodes can be disposed at narrower and closer intervals on their respective faces of a single electrolyte membrane than the conventional case. As a result, the manufacturing process can be simplified and the productivity improved.

The present invention has been described by referring to each of the above-described embodiments. However, the present invention is not limited to the above-described embodiments only, and those resulting from any combination of them as appropriate or substitution are also within the scope of the present invention. Also, it is understood by those skilled in the art that the order in which the membrane electrode assembly is manufactured may be changed as appropriate in each embodiment and various modifications such as changes in design may be made in a fuel cell or membrane electrode assembly and the embodiments added with such modifications are also within the scope of the present invention.

Figure 8:
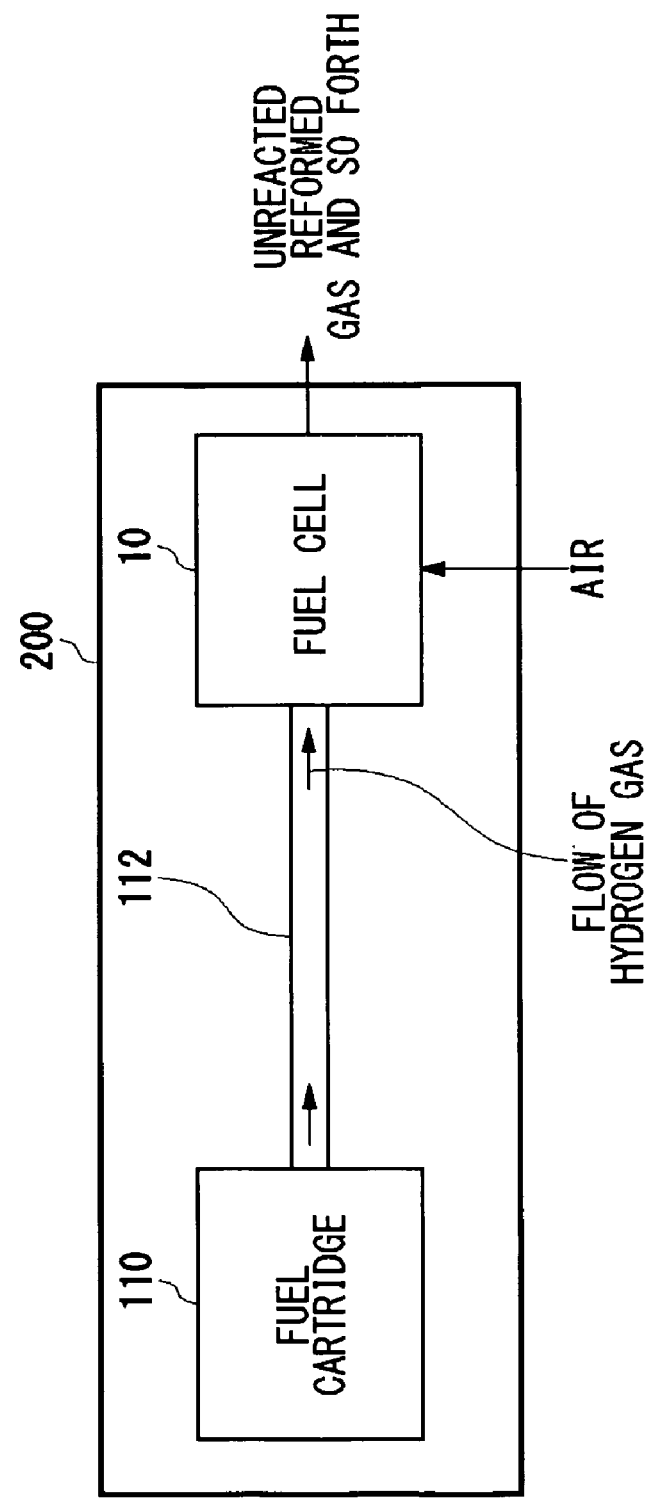
FIG. 8 is a schematic diagram showing a structure of a fuel cell system according to a modification of a first embodiment.

For example, in a fuel cell system according to the first embodiment, the hydrocarbon fuel is changed into a reformed gas containing hydrogen by the use of the reformer 120. However, like a fuel cell system 200 as illustrated in FIG. 8, the fuel system may be provided where the reformer is omitted by the use of a gas whose main component is hydrogen as the fuel.

While the preferred embodiments of the present invention have been described using specific terms, such description is for illustrative purposes only, and it is to be understood that changes and variations may further be made without departing from the spirit or scope of the appended claims.

What is claimed is:

1. A membrane electrode assembly, including:
   an electrolyte membrane;
   an anode disposed on one face of said electrolyte membrane; and
   a cathode disposed on the other face of said electrolyte membrane,
   wherein said electrolyte membrane has a non-electrode-forming region where said cathode is not disposed thereon and an electrode-forming region where said cathode is disposed thereon,
   wherein the non-electrode-forming region has a thin membrane region where the membrane is thinner than that in the electrode-forming region.

2. A membrane electrode assembly according to claim 1, wherein a plurality of cells, each comprising said electrolyte membrane, said anode and said cathode, is formed in a planar arrangement, and
   wherein the thin membrane regions are formed between cathodes of adjacent cells.

3. A membrane electrode assembly according to claim 1, wherein the thin membrane region has a recess in a cathode-side surface of said electrolyte membrane.

4. A membrane electrode assembly according to claim 1, wherein the thin membrane region has a groove surrounded by the electrode-forming region.

5. A membrane electrode assembly according to claim 4, wherein the groove is formed linearly.

6. A membrane electrode assembly according to claim 4, wherein the groove is formed in a bent shape.

7. A membrane electrode assembly according to claim 4, wherein the groove is formed discontinuously.

8. A membrane electrode assembly according to claim 4, wherein the groove is greater than or equal to 5 µm and less than or equal to 200 µm in width.

9. A membrane electrode assembly according to claim 1, wherein the thin membrane region has a thickness of approximately 50% or more of the membrane thickness in the electrode-forming region and a thickness 5 µm or more thinner than the membrane thickness in the electrode-forming region.

10. A membrane electrode assembly according to claim 1, wherein the ratio of an area of the thin membrane regions to that of the electrode-forming regions is in a range of greater than or equal to 0.01 and less than or equal to 0.1.

11. A membrane electrode assembly, including:
    an electrolyte membrane;
    an anode disposed on one face of said electrolyte membrane; and
    a cathode disposed on the other face of said electrolyte membrane,
    wherein said electrolyte membrane has a non-electrode-forming region where said cathode is not disposed thereon and an electrode-forming region where said cathode is disposed thereon, and wherein in the non-electrode-forming region, said electrolyte membrane has a thin membrane region where the thin membrane is recessed lower than the surface of said electrolyte membrane in an adjacent electrode-forming region.

12. A fuel cell including a membrane electrode assembly according to claim 1.

13. A method for manufacturing a membrane electrode assembly which includes: an electrolyte membrane; an anode disposed on one face of the electrolyte membrane; and a cathode disposed on the other face of the electrolyte membrane, wherein the electrolyte membrane has a non-electrode-forming region where the cathode is not disposed thereon and an electrode-forming region where the cathode is disposed thereon, the method including a thin membrane forming process in which a thin membrane region with a thickness thinner than that of the electrolyte membrane in the electrode-forming region and having an exposed surface is formed as part of the non-electrode-forming region.

14. A method, for manufacturing a membrane electrode assembly, according to claim 13, wherein the thin membrane forming process includes a process for removing a surface layer of the electrolyte membrane together with the cathode or the anode, using laser.

15. A method, for manufacturing a membrane electrode assembly, according to claim 14, wherein the oscillation wavelength of the laser is greater than or equal to 100 nm and less than or equal to 1100 nm.

16. A method, for manufacturing a membrane electrode assembly, according to claim 14, wherein the oscillation wavelength of the laser is greater than or equal to 180 nm and less than or equal to 550 nm.

17. A method, for manufacturing a membrane electrode assembly, according to claim 14, wherein the type of the laser is KrF excimer laser.

* * * * *